United States Patent
Myers et al.

(10) Patent No.: US 11,357,183 B2
(45) Date of Patent: Jun. 14, 2022

(54) SUSTAINABLE MACROALGAE PRODUCTION AT LARGE SCALE

(71) Applicant: Alyson Myers, Washington, DC (US)

(72) Inventors: Alyson Myers, Washington, DC (US); Steve DiMarco, College Station, TX (US); Zachary Moscicki, Newburyport, MA (US)

( * ) Notice: Subject to any disclaimer, the term of this patent is extended or adjusted under 35 U.S.C. 154(b) by 174 days.

(21) Appl. No.: 16/248,587

(22) Filed: Jan. 15, 2019

(65) Prior Publication Data

US 2019/0216030 A1     Jul. 18, 2019

Related U.S. Application Data

(60) Provisional application No. 62/617,581, filed on Jan. 15, 2018.

(51) Int. Cl.
*A01G 33/00*     (2006.01)

(52) U.S. Cl.
CPC .................................... *A01G 33/00* (2013.01)

(58) Field of Classification Search
CPC ...................................................... A01G 33/00
See application file for complete search history.

(56) References Cited

U.S. PATENT DOCUMENTS

| | | | |
|---|---|---|---|
| 7,985,267 B2 * | 7/2011 | Markels, Jr. ............ | A23K 50/10 44/307 |
| 10,257,990 B1 * | 4/2019 | Goudey ................. | A01G 33/00 |

FOREIGN PATENT DOCUMENTS

| | | | |
|---|---|---|---|
| CN | 101263780 A | * | 9/2008 |
| KR | 101161857 B1 | * | 7/2012 |

OTHER PUBLICATIONS

Advanced Research Projects Agency—Energy (ARPA-E), Seaweed Paddock Pelagic Sargassum Ranching, 2017, https://arpa-e.energy.gov/technologies/projects/seaweedpaddock-pelagic-sargassum-ranching (Year: 2017).*

Oilgae Guide to Fuels from Macroalgae, 2010, https://arpa-e.energy.gov/sites/default/files/Oilgae%20Guide%20to%20Fuels%20from%20Macroalgae%202010.pdf (Year: 2010).*

Sorheim, et al. Abandonment of Offshore Exploration Wells using a Vessel Deployed System for Cutting and Retrieval of Wellheads. 2011, SPE Arctic and Extreme Environments Conference and Exhibition, Moscow, Russia, doi: https://doi.org/10.2118/148859-MS (Year: 2011).*

Martin, et al. Commercial bottom trawling as a driver of sediment dynamics and deep seascape evolution in the Anthropocene, 2014, Anthropocene, 4:1-15 (Year: 2014).*

* cited by examiner

*Primary Examiner* — Louise W Humphrey
*Assistant Examiner* — Anjali Ajit Hirani
(74) *Attorney, Agent, or Firm* — William H. Bollman

(57) ABSTRACT

Pelagic, surface floating, macroalga, *Sargassum* is harvested at large scale from a free-roaming farm floating freely on the ocean surface, monitored and tracked with GPS drifters and contained only by naturally occurring circular currents known as eddies or gyres, without aquaculture equipment. The farming technique occurs in open ocean through the utilization of system design and technology. Satellite imagery is interpreted to locate naturally occurring *Sargassum* aggregations or mats. Harvest vessel(s) travel to an identified mat, where only a portion of the natural mat is harvested as starter culture for a free-roaming farm. Cuttings are left behind to become new plants to restore the "mother mat" for no net loss of habitat and for migration for cohabitating organisms. The remainder of the biomass is transported to the identified free-roaming farm site which is in a suitable Eddie. GPS drifters are adhered with seedlings until the crop is ready for harvest.

8 Claims, 14 Drawing Sheets

SUSTAINABLE MACROALGAE PRODUCTION AT LARGE SCALE

This application claims priority from U.S. Provisional No. 62/617,581, entitled "Sustainable Macroalgae Production at Large Scale", filed Jan. 15, 2018, the entirety of which is expressly incorporated herein by reference.

This invention was made with Government support under Award No. DE-AR0000927, awarded by the Advanced Research Projects Agency—Energy (ARPA-E), U.S. Department of Energy. The Government has certain rights in this invention.

BACKGROUND OF THE INVENTION

1. Field of the Invention

The present invention relates to sustainable expansion of macroalgae (e.g., *Sargassum*) biomass farming, harvesting and production.

2. Background of Related Art

FIG. 11 shows a block flow depicting a conventional macroalgae to biofuel conversion process 800.

In particular, as shown in FIG. 11, a macroalgae (fresh seaweed) is obtained in step 802. In step 804 the seaweed is stabilized (ensiling). In step 806 the seaweed is hydrolyzed to dilute syrup. In step 808 the syrup is detoxified and concentrated. In step 810 ABE/ABI fermentation is performed. In step 812 the crude ABE is purified. In step 814 the purified crude is upgraded to diesel range. In step 816, residues are digested. In step 818, minerals are recycled.

Macroalgae has traditionally been cultivated using gear in a fixed and defined location, for instance, within a pen or otherwise restricted fixed area. This approach has been adequate for small scale and niche markets, but the inventor hereof has appreciated that this approach faces tremendous obstacles when attempting to scale-up. Given the harsh environments of the open ocean, stationary or fixed-location farming operations using gear, ropes, cages, and other fixed equipment must survive and function in constantly challenging conditions. Fouling of gear is likely when constantly submerged in ocean water and proves to be expensive to maintain. Winds and storms can also destroy equipment fixed to the ocean floor. Fixed seaweed farms stretched out over large areas that cannot allow external boat navigation could cause significant disruption of vessels and marine traffic.

Macroalgae farming has only reached scale by harvesting natural kelp beds off the coast of California. But such harvesting depletes the natural kelp beds, *Sargassum* beds, etc., including cohabitating species, and as a result now is regulated. Conventional efforts of farming other macroalgae species have been focused on more efficient hatchery and gear.

The macroalgae, or seaweed, industry is conventionally constrained by techniques of either harvesting in the intertidal region (approximately 1 meter in depth), mowing deep water, harvesting natural kelp beds (which is unsustainable), or farming plants on a substrate of fixed rafts, ropes or other material. As a result the industry has remained at "cottage scale" for hundreds of years.

SUMMARY OF THE INVENTION

In accordance with a first aspect of the present invention, a method of sustainably growing and harvesting macroalgae in a free-floating and free-roaming ranch, the method comprising identify a wild, free-floating *Sargassum* mat in an open body of water. A fraction of the wild, free-floating *Sargassum* mat is harvested to generate a starter amount of *Sargassum* material. Individual plants of the harvested starter amount of *Sargassum* material are cut into seedlings. A first portion of the seedlings are injected adjacent the harvested wild, free-floating *Sargassum* mat. The remaining portion of the seedlings are transported a distance from the wild, free-floating *Sargassum* mat to another location in the open body of water. The remaining portion of the seedlings are deposited to the another location to form a new growth *Sargassum* ranch. At least one floating farm monitoring drifter is embedded within the new growth *Sargassum* ranch. A current location of the new growth *Sargassum* ranch is tracked over a period of days via a signal communicated from the at least one floating farm monitoring drifter.

In accordance with another aspect of the invention, a GPS drifter comprises a flotation board, wireless communications gear attached to the flotation board, and artificial *Sargassum* plants embedded in the flotation board. The embedded artificial *Sargassum* plants are configured to be naturally adhered by growing *Sargassum* seedlings within a new growth *Sargassum* mat.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
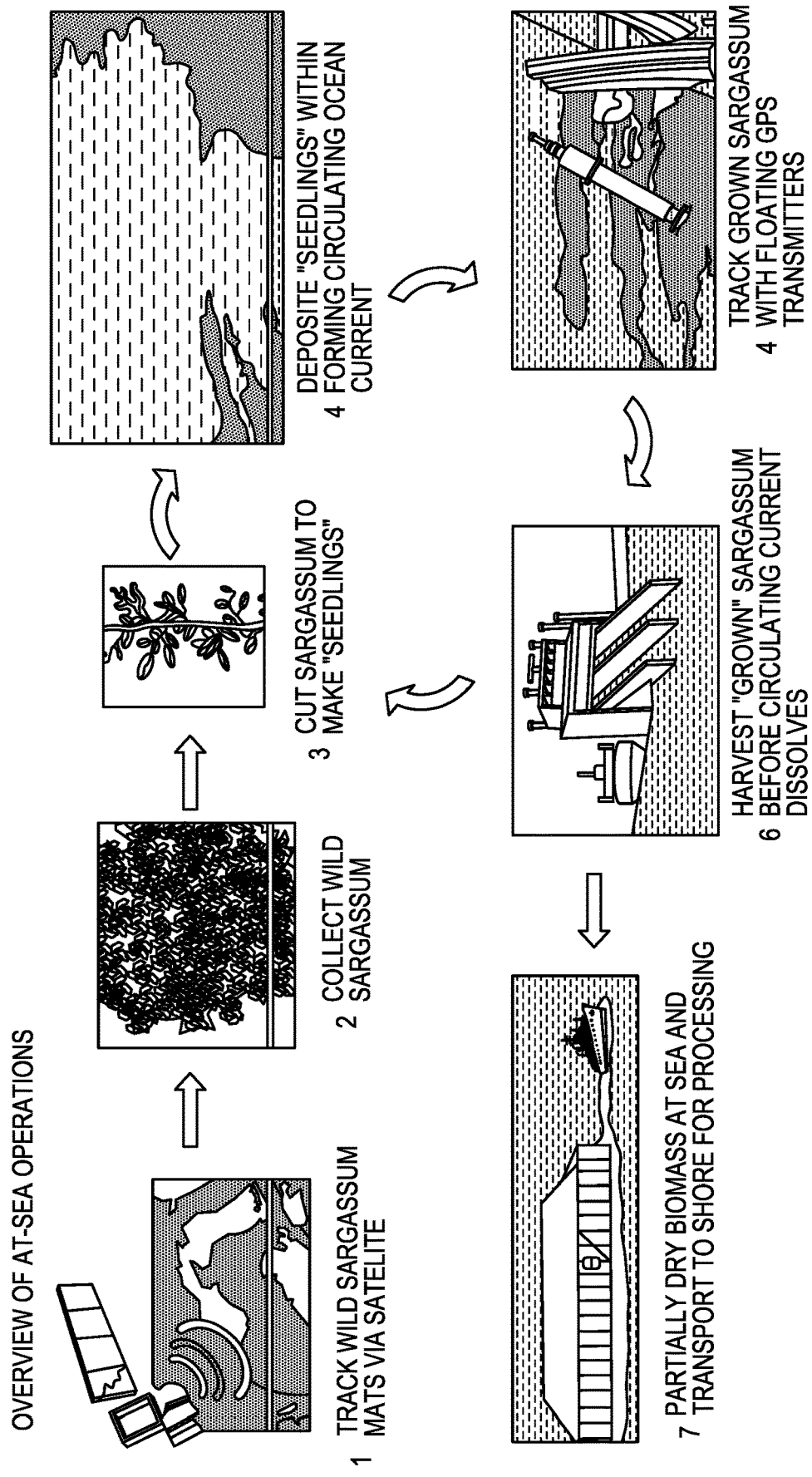
FIG. 1 shows exemplary at-sea operations of macroalgae farming, in accordance with the present invention.

The present invention proposes a new way to produce macroalgae biomass without the need for a hatchery or aquaculture gear, including drying or slurry at sea.

The present invention enables a new sustainable energy source for the US that does not require irrigational fresh water, land, fertilizers or other added nutrients. The invention paves the way for expanded ocean farming which reduces stress on declining freshwater supplies (irrigation utilizes 60-70% of fresh water on land).

The present invention provides a sustainable expansion of biomass production with a transformational change from low tech, labor-intensive, cottage-industry scale of conventional systems and techniques using moored rafts or lines producing output in tens rather than hundreds or thousands of dry metric tonne (DMT) methods to a technology-driven, marine macroalgae farming technique as disclosed herein. The subject invention provides a novel technique and system which uses the open ocean to increase scale and yield of macroalgae (*Sargassum*), while decreasing capital and operating costs for macroalgae production. Such a scaled technique has never been tried before.

According to the invention, pelagic, or surface floating, macroalga, *Sargassum Natans* or *Fluitans*, is cultivated and harvested at large scale, by using the plant's natural flotation, which carries it on the ocean surface, and natural containment in circular currents known as eddies or gyres. The intersection of the plant's physiology and oceanographic features of eddies, together with selection, and on-site monitoring and tracking allow for the elimination of aquaculture equipment. The farming technique occurs in open ocean through the utilization of system design and technology.

While macroalgae has conventionally been cultivated using gear in a fixed and defined location, the inventor hereof has appreciated that free floating ranching on the other hand avoids the challenges outlined above with respect to conventional fixed-ranch techniques and systems. With limited gear in the water afforded by the free-floating nature of the free-roaming planted *Sargassum* farm in accordance with the invention, corrosion and fouling of equipment is minimal. Additionally, the invention includes a vegetative replication process inherent to *Sargassum* within the harvesting process, thus disruption or movement by boats through the free-floating crop do not destroy the mat. For example, if *Sargassum* plants are cut by motor blades, or if a storm or high winds intersect with a free-floating ranch, the plant will grow back and likely interweave with the rest of the free-floating mat.

Macroalgae, like land plants, use carbon, nitrogen and phosphorus to grow and build biomass. Farming and harvesting of these plants has the potential to reduce carbon dioxide in surface waters which otherwise contributes to ocean acidification, while producing carbon neutral fuel or other sustainable products, sequestration (negative emissions), etc.

Nutrient pollution which is a cause of hypoxia (dead zones) is reduced, as is ocean acidification (oa). Large-scale farming of *Sargassum* as disclosed herein offers environmental benefits to degraded aquatic systems. It also increases habitat and provides shade for marine organisms in the open ocean water, thereby cooling the ocean water. The inventive open-ocean farming process and system can also shade coral thus potentially decreasing bleaching. As a result, free-floating *Sargassum* farming in the open ocean as disclosed herein has the potential to add to the goal of decreasing (or lowering the rate of an increase) in temperature of the water column, providing encouragement for adoption of the process for broader environmental goals.

The techniques of the present invention eliminate both hatchery and stationary gear for *Sargassum* farming. The invention has also pioneered a way to reduce by-catch to work symbiotically with oceans and marine organisms.

The present invention enables large scale, efficient harvesting of bioenergy through open ocean cultivation/harvest of macroalgae in US waters. The invention implements a harvesting process within a cultivation and harvest system that mimics natural systems that currently grow millions of tons of biomass without aquaculture gear. *Sargassum Natans* and *Fluitans*—through their unique, floating physiology and their vegetative reproduction—provide an opportunity to create a crop that mimics natural production. The elimination of aquaculture gear allows scaled production which avoids conflict with marine species (e.g., entanglement), minimizes storm damage, and avoids damage to ships. Production per unit area is more dense, as the *Sargassum* can be harvested from the outer edge rather than interior to the free-floating farm.

The circular currents of the Gulf of Mexico, which exist through crop maturity—typically +/−60 days—effectively substitute for retentive gear at a lower cost. Labor is minimized, and there is no hatchery, as plants are divided through a mechanical, ship-board device. Sensors on an adhered GPS drifter (as will be described later below) monitor nutrients, provide GPS coordinates for the free-floating *Sargassum* farm, and/or send images of the *Sargassum* farm to a central server at a home base.

The ranching process provides a benefit to the growing waters through an increase in habitat for marine species at a critical time in their life cycle in spring and summer as the farming and harvesting activity increases the total biomass in the Gulf prior to mid-late summer harvest. Floating *Sargassum* is minimally intrusive in marine space.

As will be explained herein below, industrial scale farming of macroalgae is achieved without aquaculture gear, with guidance of finding candidate *Sargassum* mats for seeding by satellite imagery to produce a starter culture. A new, free-roaming *Sargassum* farm is then seeded in a suitable current in the open ocean, monitored and tracked with a drifting monitoring device, bound only regionally by circular currents, to final harvest and delivery to shore. The seeded *Sargassum* 'farm' mats are tracked by embedded GPS drifters. As cuttings are added to a selected current, the seedlings adhere naturally to one another, creating a free-floating *Sargassum* mat to use as a farm that is purposely calculated to have a favorable trajectory in the selected circular current. A semi-autonomous farm monitoring vehicle (i.e., a GPS drifter) is deployed with the seedlings to drift and float in the same current with the *Sargassum* so as to be adhered within the mat forming the *Sargassum* farm.

FIG. 1 shows exemplary at-sea operations of macroalgae farming, in accordance with the present invention.

The present invention provides a technique and system for free-range farming of *Sargassum Natans* and *Sargassum Fluitans* (free-floating macroalgae) at large scale in open ocean without aquaculture gear or a hatchery or the need to moor, cage or otherwise fix the location of the *Sargassum* farm, thereby increasing yield and de-coupling capital and labor from production costs. Instead, the inventive *Sargassum* farming relies on a plant with flotation, free-floating and free-roaming remote monitoring sensing, and naturally occurring ocean gyres (circular currents). The inventive technique also includes harvesting of *Sargassum* using specific equipment and techniques that avoid take of endangered species.

The inventive free-floating and free-roaming, sustainable *Sargassum* farm is not constrained by gear, but instead requires embedded on-site monitoring and electronic tracking of a cultivated crop particularly placed initially through knowledge and monitoring of currents in order to provide an optimal harvest at the proper time before the free-floating, free-roaming, cultivated *Sargassum* crop disperses or beaches.

The cost of hatchery and aquaculture gear is greatly reduced by targeting the pelagic, or naturally floating, macroalga *Sargassum*, which drifts along the *Sargassum* Migratory Loup. The physiology of Pelagic *Sargassum*, a yellow-brown macroalga or seaweed, makes it a good model species for open-ocean farming or ranching as disclosed herein. Two species commonly found offshore in the Gulf of Mexico (GOM), *S. Natans* and *S. Fluitans*, have air bladders that allow for flotation at the ocean surface often resulting in the formation of long weed lines or dense mats. *Sargassum* also has high carbon content, making it a good candidate for conversion to biofuel. The present invention targets these aggregations for manipulation and harvest.

As shown in step 1 of FIG. 1, the inventive process begins with the interpretation of satellite imagery to locate natural *Sargassum* aggregations of wild *Sargassum* mats to serve as candidates from which to partially harvest to make seedlings for a separate, remote free-floating, free-roaming *Sargassum* farm specifically placed in a suitable current of the open ocean.

Figure 2:
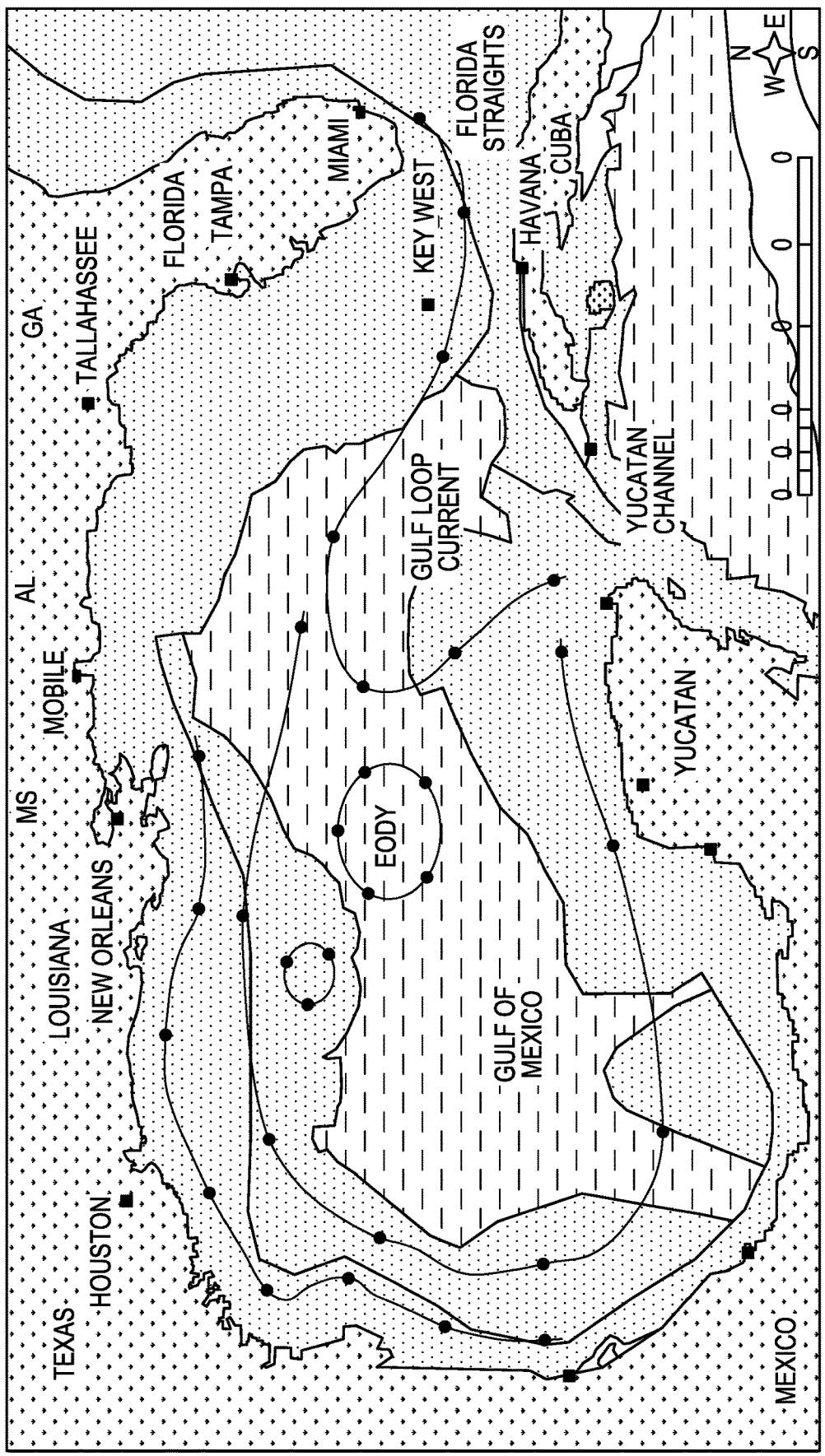
FIG. 2 shows a new growth *Sargassum* farm deposited on currents known as the *Sargassum* Migratory Loop or eddies that spin off the Loop Current.

The US EEZ shows 1,000,000 tons or more (depending on the year) of naturally floating *Sargassum Natans* and *Fluitans* in the Gulf of Mexico and the Caribbean (USVI, Puerto Rico). The aquatic system of the Gulf of Mexico offers circular currents to regionally contain and generally locate the free-floating *Sargassum* farm until the crop is ready for harvest. The plants float on currents known as the *Sargassum* Migratory Loop as shown in FIG. 2. Calculations show that only 65% of the circular current is used to produce the equivalent of a 1000 hectare farm of adhered, free-floating *Sargassum*, and thus the inventor hereof has appreciated that there is room to expand on natural production. Moreover, this calculation relates to only one of several gyres, indicating the potentially large expansion of production of *Sargassum*.

Preferably, the initial *Sargassum* mat(s) selected are those which are closest to shore, and preferably those mats which have a predicted trajectory which retains them in open ocean waters (no beaching) for at least the growing cycle of *Sargassum* (e.g. 60 to 90 days).

In disclosed embodiments, satellite imagery from ESA Sentinel 3a is used. ESA Sentinel 3b data may additionally or alternatively be used. Sentinel 2a and 2b and Landsat may be used for higher resolution near shore.

Referring back to FIG. 1, In step 2 of FIG. 1, wild *Sargassum* is collected from the selected naturally occurring *Sargassum* mat.

In particular, once a suitable starter mat of *Sargassum* has been identified and located, a harvest vessel travels to the site and harvests only a portion or percentage of the initial, free-floating wild, natural mat. Only a fractional percentage (e.g., 50% or less) of the free-floating wild *Sargassum* mat is harvested. This partial harvest provides an indigenous starter culture for use in cultivating and growing a floating created *Sargassum* farm in a regionally remote location (another free-floating, free-roaming mat in the current).

*Sargassum* may be collected or harvested via a continuous mechanical process, e.g., conveyor belt.

In step 3 of FIG. 1, the *Sargassum* that is harvested from the wild *Sargassum* mat is mature plants, which are then cut or otherwise divided to make *Sargassum* cuttings, i.e., "seedlings".

In particular, *Sargassum* plants reproduce by division or fragmentation, with each fragment growing into a new plant. The seedlings are divided between use as a restorative biomass for the original mat and for the destination cultivated free-floating *Sargassum* farm crop. The seedlings that are used as a restorative biomass are placed to adhere back to the initial wild, natural *Sargassum* mat from which the *Sargassum* seedlings were harvested.

Thus, a first portion of the *Sargassum* cuttings are left to drift and re-adhere to the harvested wild *Sargassum* mat to restore what remains of the wild *Sargassum* mat. Ideally the remaining mat is restored to a target of no net decrease in the size of the utilized wild mat. These *Sargassum* cuttings are left to restore the "mother mat" in several days' time for no net loss of habitat. The role of *Sargassum* as habitat is well-documented, and restoration is considered by the inventors to be vital to the ecosystem and thus the successful deployment of the technique. Each cutting becomes a new plant for the harvested mat. Plants are left at the harvest site also for migration for cohabitating organisms.

Preferably the harvested *Sargassum* is cut with high pressure water jets. Preferably the harvested *Sargassum* is not cut with moving blades because of eventual problems due to jamming or corrosion of the moving blades.

In step 4, the remaining portion of the seedlings is deposited within a forming circulating open ocean current to form a new growth mat.

In particular, the remaining portion of the *Sargassum* cuttings is transported to another location regionally distinct from the wild, *Sargassum* mat, and is selected for forming a 'planted' free-floating, free-roaming *Sargassum* farm site bounded only by the circular current. Preferably the *Sargassum* farm location within the forming circulating ocean current is close to shore with a trajectory sufficient for the restorative biomass to mature before being beached. Thus, the remainder of the *Sargassum* biomass cuttings are transported to the remote, free-roaming farm site which is selected in a suitable eddie or other circular current that bounds the farm in a regional area long enough for the seedlings to grow into mature plants at, e.g., a rate of 0.08 doublings per day.

Before the newly created, free-floating, free-roaming *Sargassum* farm is eventually harvested, it will have provided additional habitat at a critical time for marine life during the early life stage thereby assisting the marine ecosystem. An increase in fisheries is likely to result.

In step 5, the newly created, free-floating and free-roaming *Sargassum* farm is embedded with a GPS drifter including a Global Positioning System (GPS) or other satellite-based location system, together with a wireless communication system, on a floatation device, e.g., floating board.

The GPS drifter communicates location and sensory data such as water temperature, air temperature, available nutrients, photos and/or video of the *Sargassum* mat, to a central server or other central data-gathering terminal and database to provide tracking information of the GPS drifter, which in turn locates the created, free-floating, free-roaming *Sargassum* farm to which the GPS drifter is adhered.

The GPS drifter is preferably embedded with the *Sargassum* seedlings in the free-roaming *Sargassum* farm so that the *Sargassum* plants within the mat naturally adhere to the GPS drifter. This permits the free-roaming *Sargassum* farm to be tracked in relation to the floating GPS and transmitter on an embedded GPS drifter.

The seedlings and GPS drifter are placed so as to grow and adhere naturally into the free-floating *Sargassum* farm, until that cultivated, free-roaming crop is ready for harvest. To facilitate adhering of both the seedlings and the GPS drifter into the *Sargassum* farm, it is preferred that the seedlings and GPS drifter be placed from the side of the ship facing an oncoming current, so that the seedlings and GPS drifter will tend to be pushed together by the current against the side of the ship.

Also to facilitate adhering of the GPS drifter to the live *Sargassum* within the *Sargassum* farm, the GPS drifter preferably includes artificial *Sargassum* along a periphery of a floating board so as to be adhered using the natural adhering capabilities of adjacent live *Sargassum* plants.

In accordance with the principles of the present invention, a free-floating *Sargassum* farm is created, adhered to a GPS drifter that monitors and accurately tracks it in real-time movement and travel due to environmental forces such as winds, storms, or hurricanes. Unanticipated movement of the *Sargassum* farm mat does not cause a prohibitive disruption to the ranching process as at least one GPS drifter in accordance with the present invention is deployed and adhered in each farmed mat, enabling the *Sargassum* farm to move and nevertheless be tracked wherever it is in the open ocean within reach of the deployed satellite location system (e.g., GPS, GLONASS, etc.)

Figure 3A:
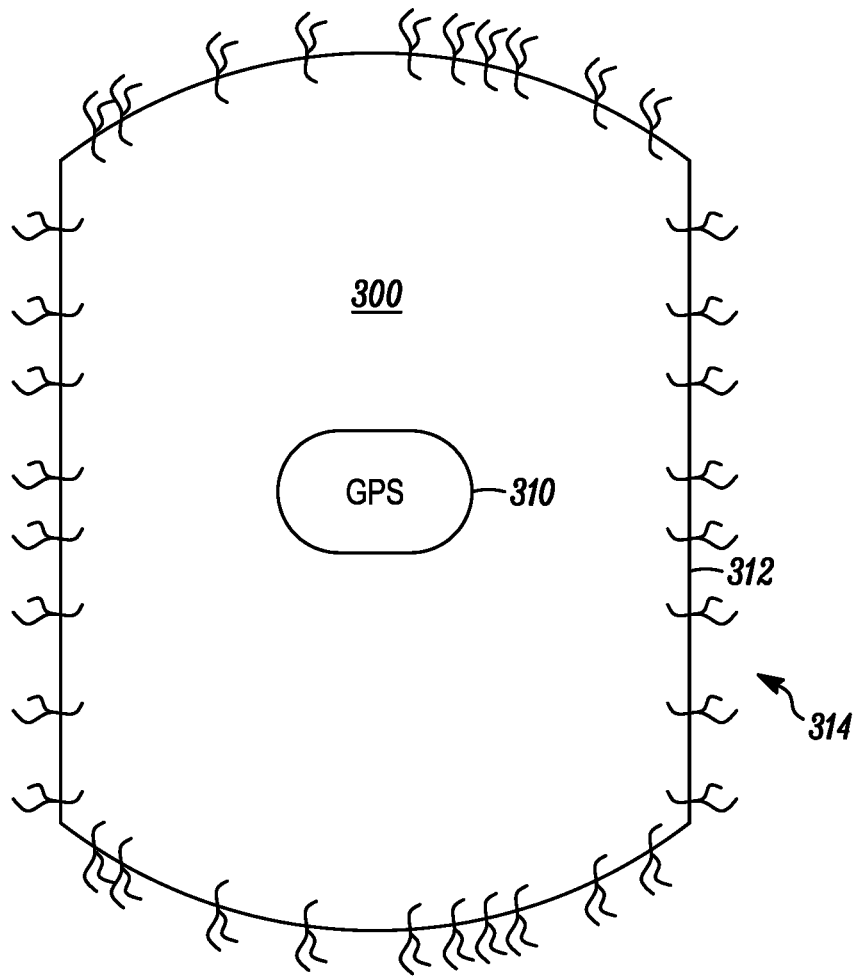
FIGS. 3A and 3B show a first embodiment of a GPS drifter.
Figure 3B:
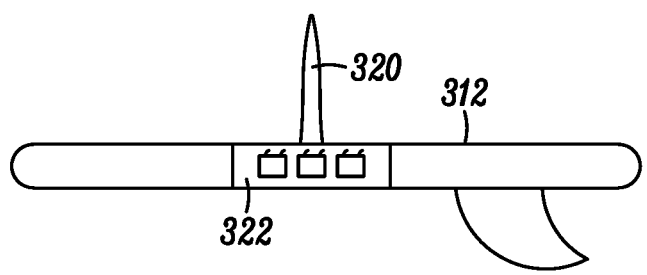

FIGS. 3A and 3B show a first embodiment of a GPS drifter.

In particular, FIG. 3A shows a top view of a GPS drifter 300, and FIG. 3B shows a side view of the GPS drifter 300. The GPS drifter 300 comprises a floatation board 312, and a GPS/communication system 310 including a GPS antenna 320.

Importantly, the GPS drifter 300 includes artificial *Sargassum* plants 314 embedded within the flotation board 312. The live *Sargassum* seedlings placed in the new growth *Sargassum* mat can naturally adhere to the artificial *Sargassum* plants 314 to thus securely adhere to the GPS drifter 300. The GPS/communication system 310 is made waterproof, and includes an antenna 320 and battery 322. Optionally the battery 322 may be charged or replaced with a solar panel.

The GPS drifter 300 is preferably weighted so as to stay upright before being fully adhered to the live *Sargassum*. Thus, a weighted fin may be included, or other design (self-righting) such that the GPS drifter 300 has an appropriately positioned center of gravity.

Figure 4A:
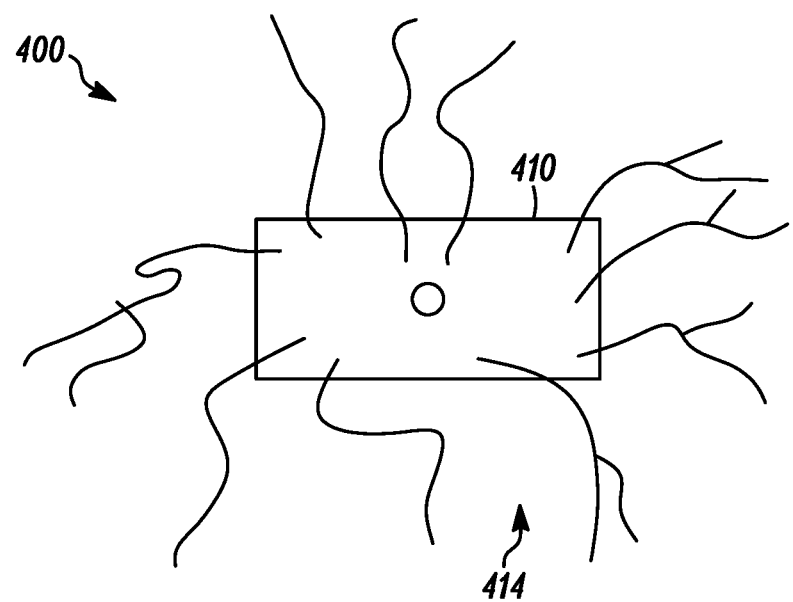
FIGS. 4A and 4B show a second embodiment of a GPS drifter.
Figure 4B:
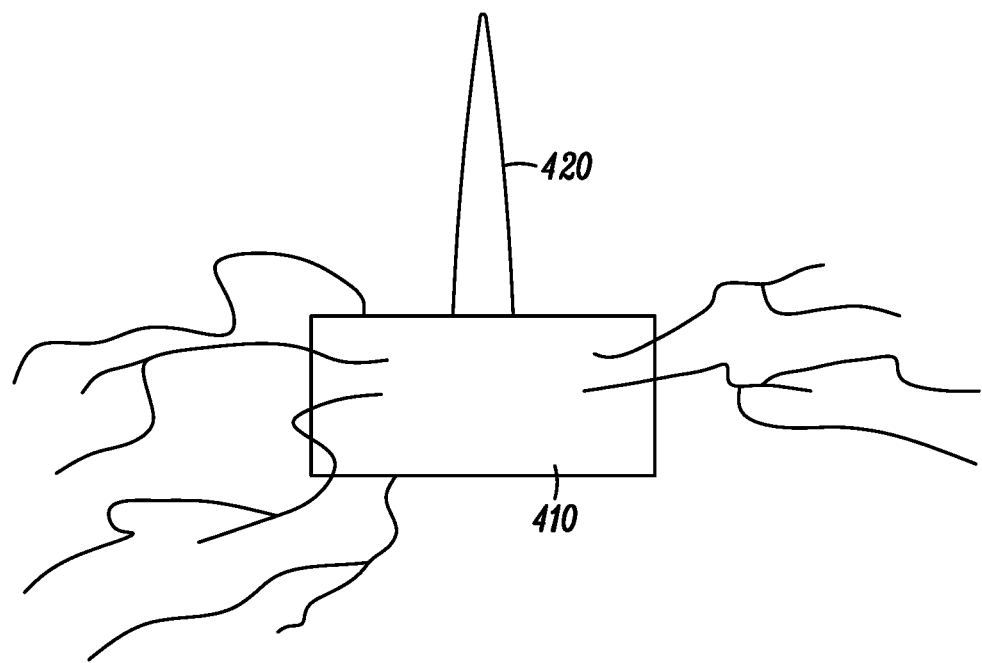

FIGS. 4A and 4B show a second embodiment of a GPS drifter 400.

In particular, FIG. 4A shows a top view of the GPS drifter 400, and FIG. 4B shows a side view of the GPS drifter 400.

The GPS drifter 400 includes a waterproof, floating GPS/communication system 410 of a design much like a radio beacon or EPIRB (emergency position-indicating radio beacon station) with embedded artificial *Sargassum* 414.

The artificial *Sargassum* 414 may be a 3-D printed *Sargassum* mat.

The semi-autonomous farm monitoring GPS drifter 300, 400 provides real-time (or stored) data and/or video monitoring of a *Sargassum* mat. The GPS drifter 300, 400 is preferably constructed to communicate via Wi-Fi, cellular, or broadband satellite to a home base. Data from the semi-autonomous farm monitoring GPS drifter 300, 400 preferably includes visuals (e.g., by low-res camera to reduce data transmission requirements) and GPS coordinates. The semi-autonomous farm monitoring GPS drifter 300, 400, or sea drone, may be equipped with an automatic identification system (AIS) and power management. Propulsion may be included, though not in a preferred embodiment.

The GPS drifter 300, 400 preferably includes sensors for determining various criteria important to tracking and locating the new growth *Sargassum* farm, as well as to the environment for optimal growing. For instance, the sensors may include sensors for measuring nitrogen/phosphorus levels, water and air temperature, wind speed and direction, barometric pressure, and/or a camera that will remain with the crop to provide real time information. The GPS drifter 300, 400 drone provides information on adequate nutrient supply, crop coherence in the circular current, and visual crop growth information.

The disclosed GPS drifter 300, 400 includes a flotation board 312, wireless communication gear 310, 410 and 3D-printed *Sargassum* plants 314, 414 embedded in the flotation board.

The flotation board 312 may be made of organic material such as wood. Alternatively the flotation board 312 may be made of plastic.

Ideally the 3D-printed *Sargassum* plants 314, 414 are strategically located on the flotation board 312 so as to provide advantageous flotation characteristics. For instance, the 3D-printed *Sargassum* plants 314, 414 are located so as to counter-balance weight of the wireless communications gear 310, 410 so as to mimic *Sargassum* flotation. The 3D-printed *Sargassum* plants 314, 414 may also or alternatively placed around the periphery of the flotation board 312.

The flotation board 312 may be, e.g., round or elongated.

The wireless communication gear 310, 410 preferably includes at least one or more sensors.

The wireless communication gear 310, 410 further preferably includes apparatus to communicate to a centrally-located server configured to aggregate monitoring data.

The wireless communication gear 310, 410 further preferably includes a GPS circuit to continuously or periodically or intermittently monitor a location of the GPS drifter 300, 400 (and thus the attached live *Sargassum* mat).

The wireless communication gear 310, 410 may further include a temperature sensor to monitor temperature of the ocean surface water and/or air of the environment in which the GPS drifter 300, 400 is placed. The wireless communication gear 310, 410 of the GPS drifter 300, 400 may also include a sounder to measure a depth to the ocean bottom.

The wireless communication gear 310, 410 further includes a wireless transmitter to transmit data and/or video to the central server.

The wireless communication gear 310, 410 may include a wireless receiver to receive control commands relating to operation of the wireless communication gear 310, 410. For instance, camera on/off may be controlled remotely from the server or other remote location. The camera may also be panned left or right or up or down remotely.

The artificial *Sargassum* plants (i.e., the 3D-printed *Sargassum* plants) 314, 414 are intended for adhesion to live *Sargassum* plants within the *Sargassum* farm adjacent to which the GPS drifter 300, 400 is placed. In this way, the adhered GPS drifter 300, 400 monitors the location of the new growth *Sargassum* farm mat.

Referring back to FIG. 1, in step 6, a grown (i.e., mature) *Sargassum* farm is ideally harvested before its circulating current dissolves. The free-roaming *Sargassum* farm is preferably harvested before it beaches on a shore.

A suitably outfitted large vessel such as a containership, modified to include a gathering arm, and a conveyor system which includes bycatch avoidance, may be used to harvest the material.

Preferably the free-floating Sargassum farms will have different projected time of harvest sufficient to enable the harvesting containership and other harvest equipment to be used to harvest each of the free-floating Sargassum farms.

The projected time of harvest may be calculated based on tracking and other monitored information obtained from the adhered GPS drifter, together with historical patterns for the open ocean current in which the Sargassum farm is placed. Harvest may be scheduled as the current in which the Sargassum farm dissolves, or before a time when the Sargassum farm is projected to be beached.

The circular current in which the Sargassum farm is created ideally is transporting additional, free-floating Sargassum farms placed within the same current.

From step 6 the process either returns to step 3 to make more "seedlings", or continues on to step 7.

In step 7 of FIG. 1, a biomass of harvested Sargassum is partially dried (or slurried) at sea and transported to shore for processing. If the free-floating Sargassum farm is harvested near shore, then tugs and barges may be used instead of a containership. However, in disclosed embodiments harvesting of the Sargassum farm is performed farther out to sea, making tugs and barges less practical as compared to a suitably outfitted containership.

FIGS. 5A to 5D show a first embodiment of harvest and transport of Sargassum by creation of buoyant clumps of harvested Sargassum for more efficient transport, in accordance with a first exemplary embodiment of the present invention.

Figure 5A:
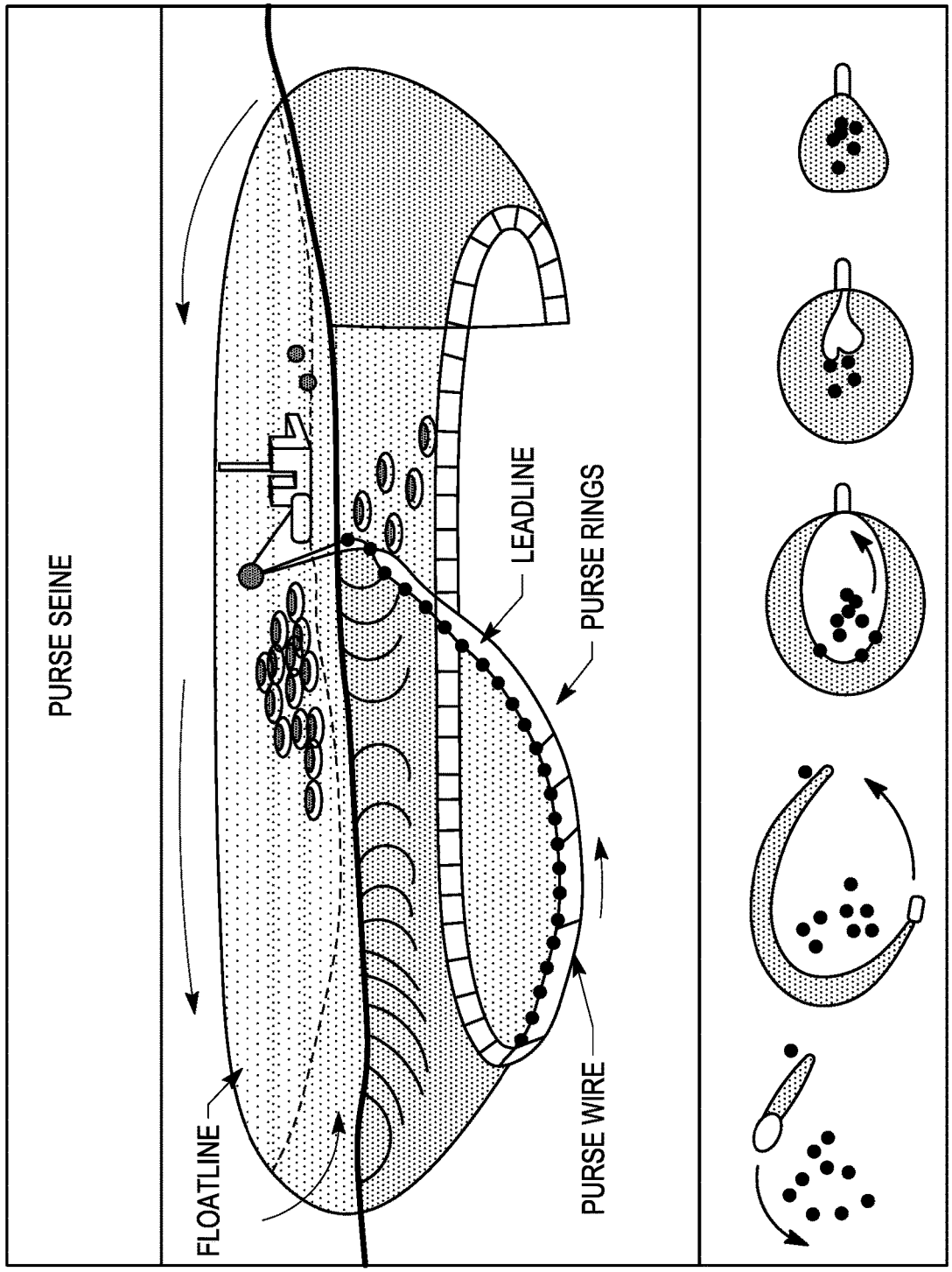
FIGS. 5A to 5D show a first embodiment of harvest and transport of *Sargassum* by creation of buoyant clumps of harvested *Sargassum* for more efficient transport, in accordance with a first exemplary embodiment of the present invention.

In particular, as shown in FIG. 5A, the purse seine technique is used to collect and densify mats of Sargassum. In disclosed embodiments bubbles are injected underneath the Sargassum mat to increase its buoyancy.

Figure 5B:
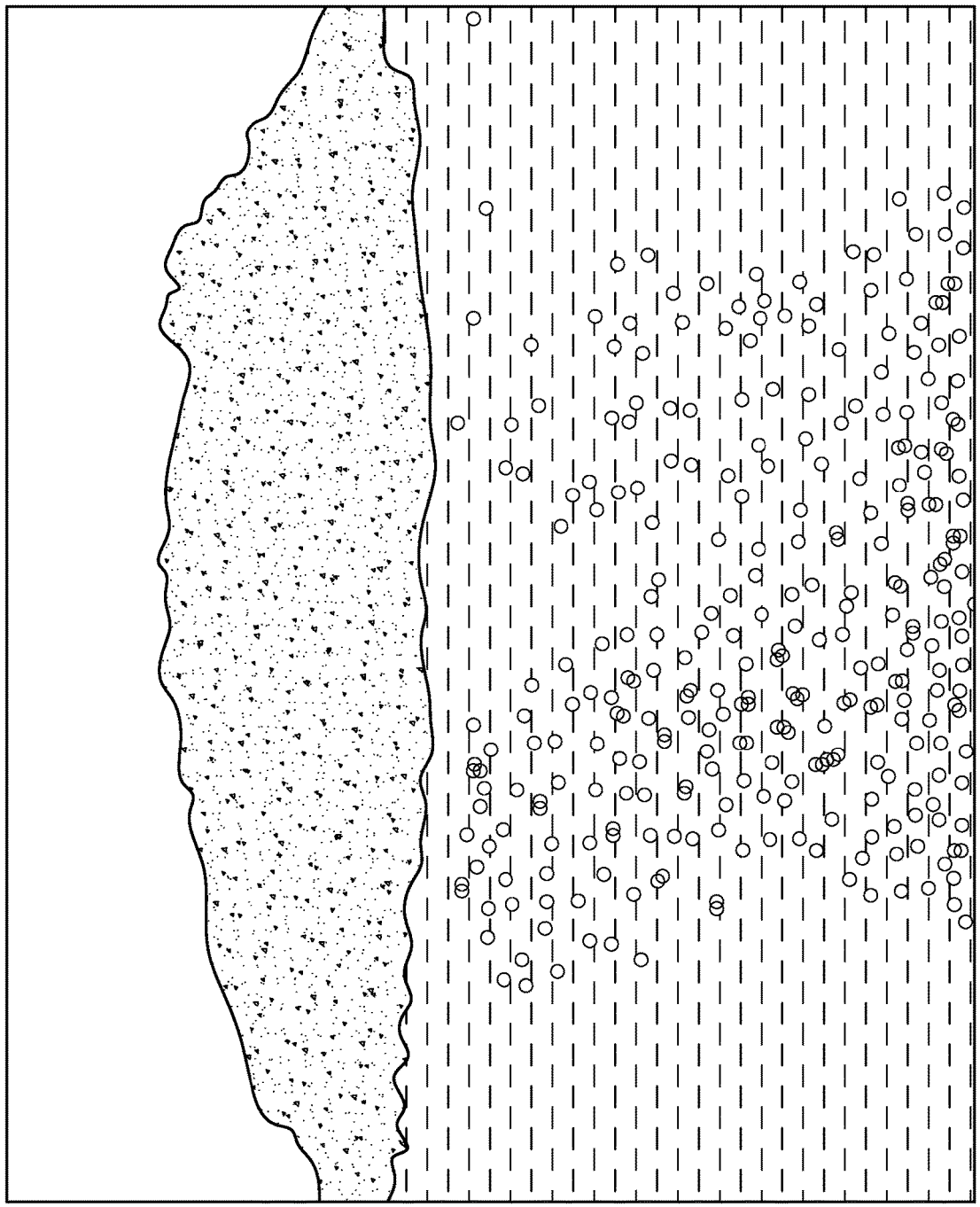

FIG. 5B shows mats constricted to remain in bundles.

Figure 5C:
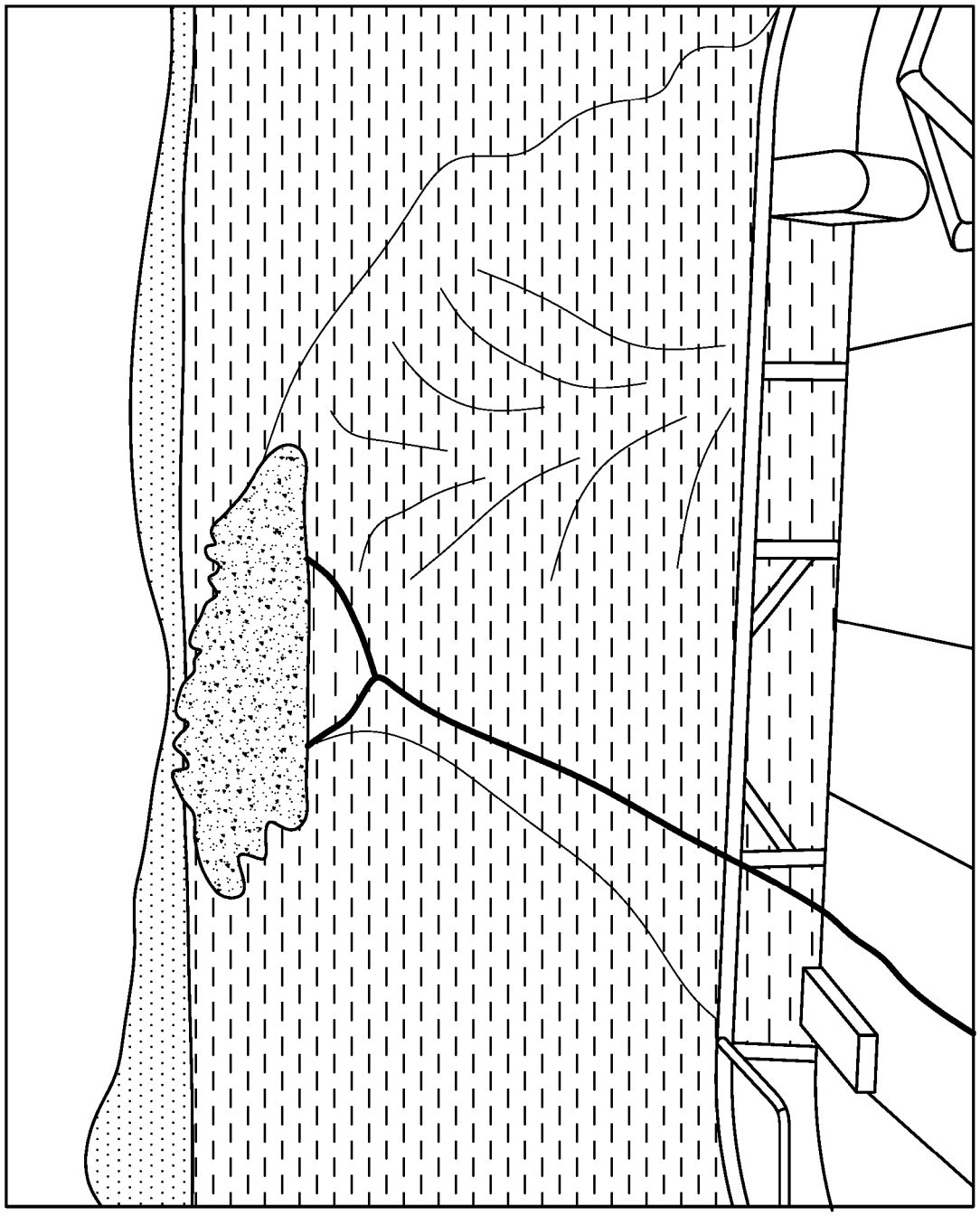

FIG. 5C shows that as bundles are towed to shore, a top portion dries in the sun, thus reducing the overall weight of the mat bundle allowing higher floating for more drying and less hydrodynamic drag.

Figure 5D:
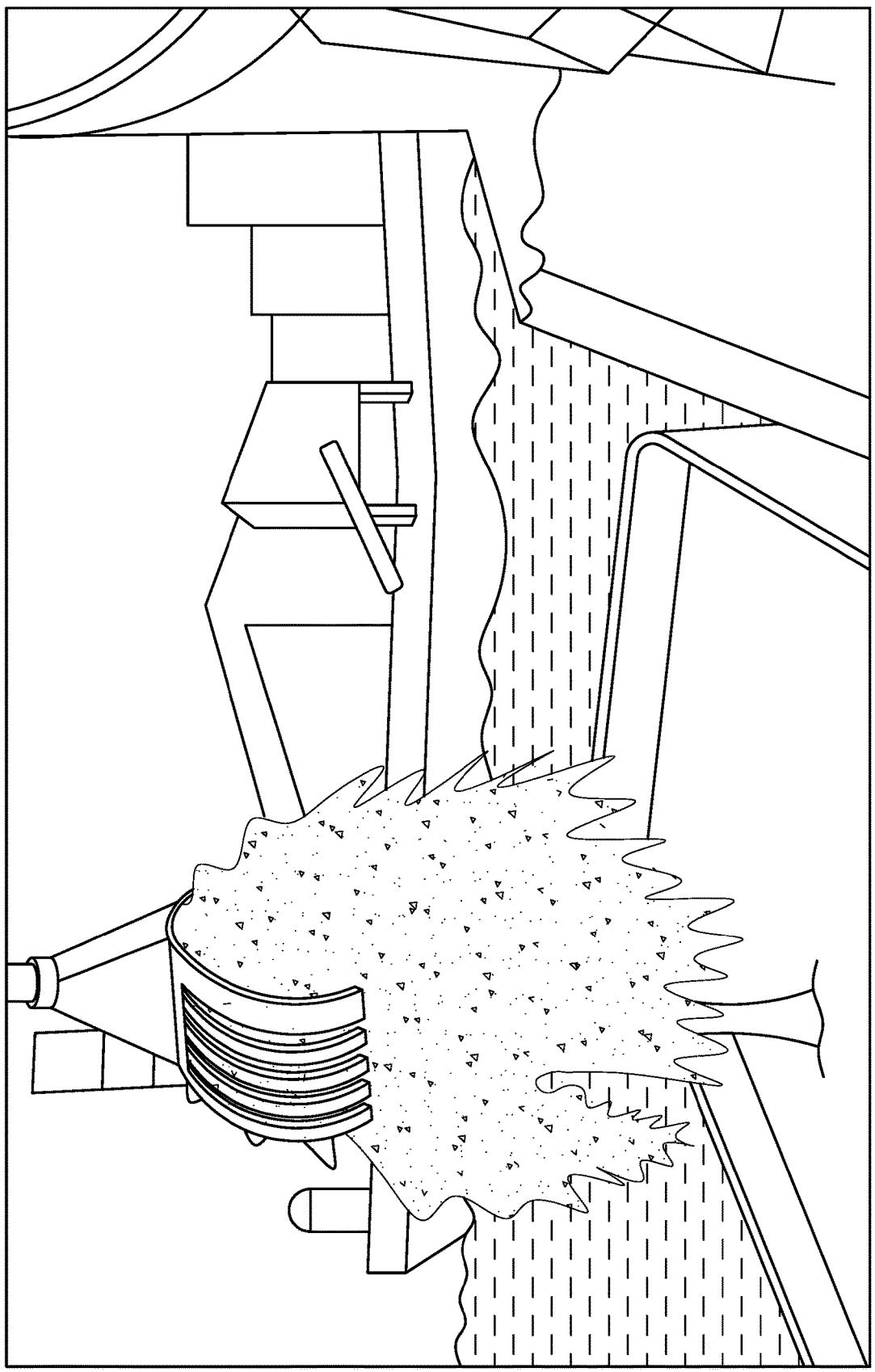

FIG. 5D shows a crane used to transfer Sargassum from sea to a processing facility.

Figure 6:
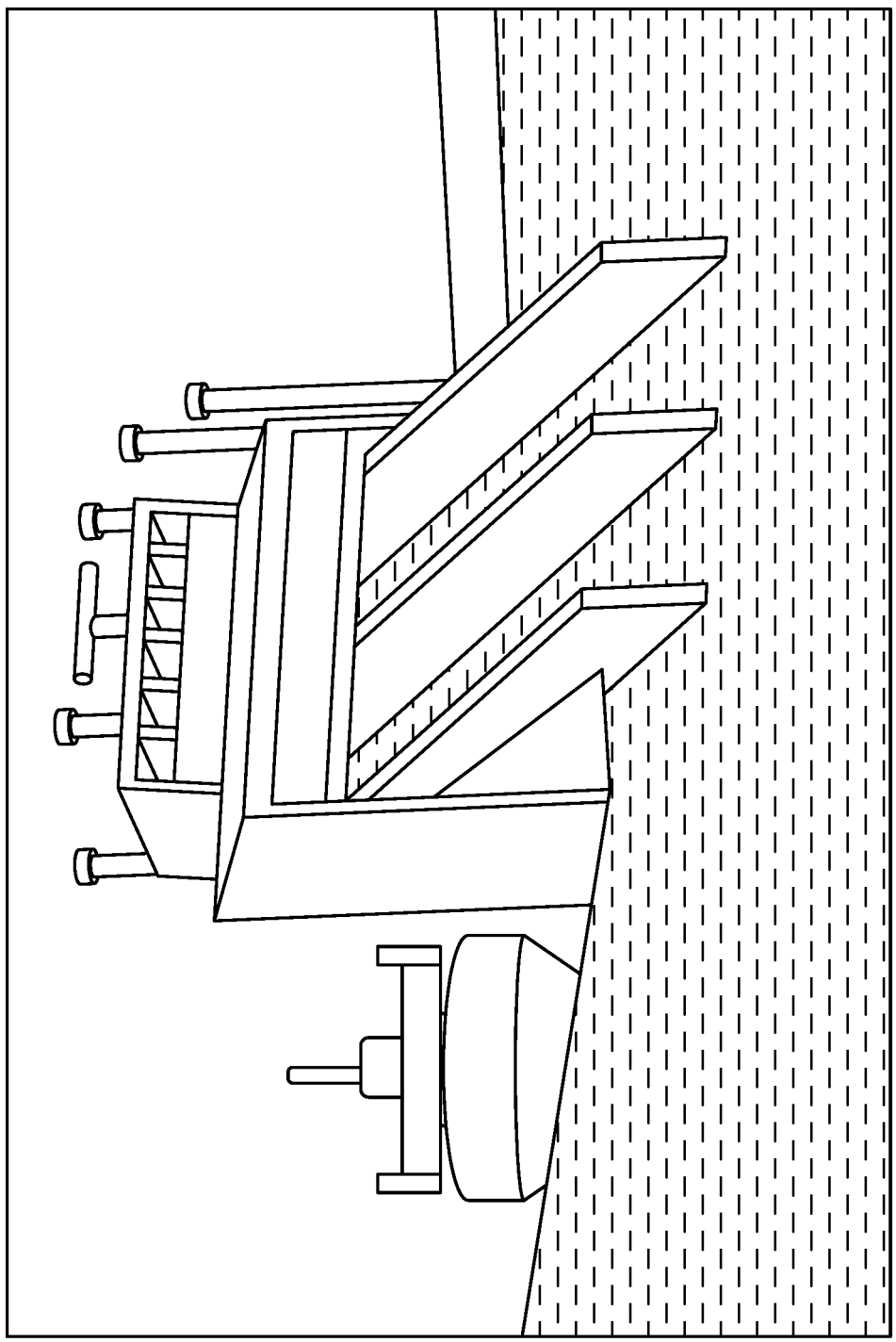
FIG. 6 shows harvest and transport of *Sargassum* by the creation of *Sargassum* slurry for greater packing density and transport efficiency, in accordance with a second exemplary embodiment of harvesting by the present invention.

FIG. 6 shows harvest and transport of Sargassum by the creation of Sargassum slurry for greater packing density and transport efficiency, in accordance with a second exemplary embodiment of harvesting by the present invention.

In particular, as shown in FIG. 6, grown Sargassum is separated and collected using mechanical means, e.g., a conveyor belt.

The Sargassum is processed into slurry as it is collected.

Tanks on a containership may be filled with slurry and transported to shore. Alternatively the slurry may be transported to a central processing center off shore or on shore via subsea pipeline.

Figure 7:
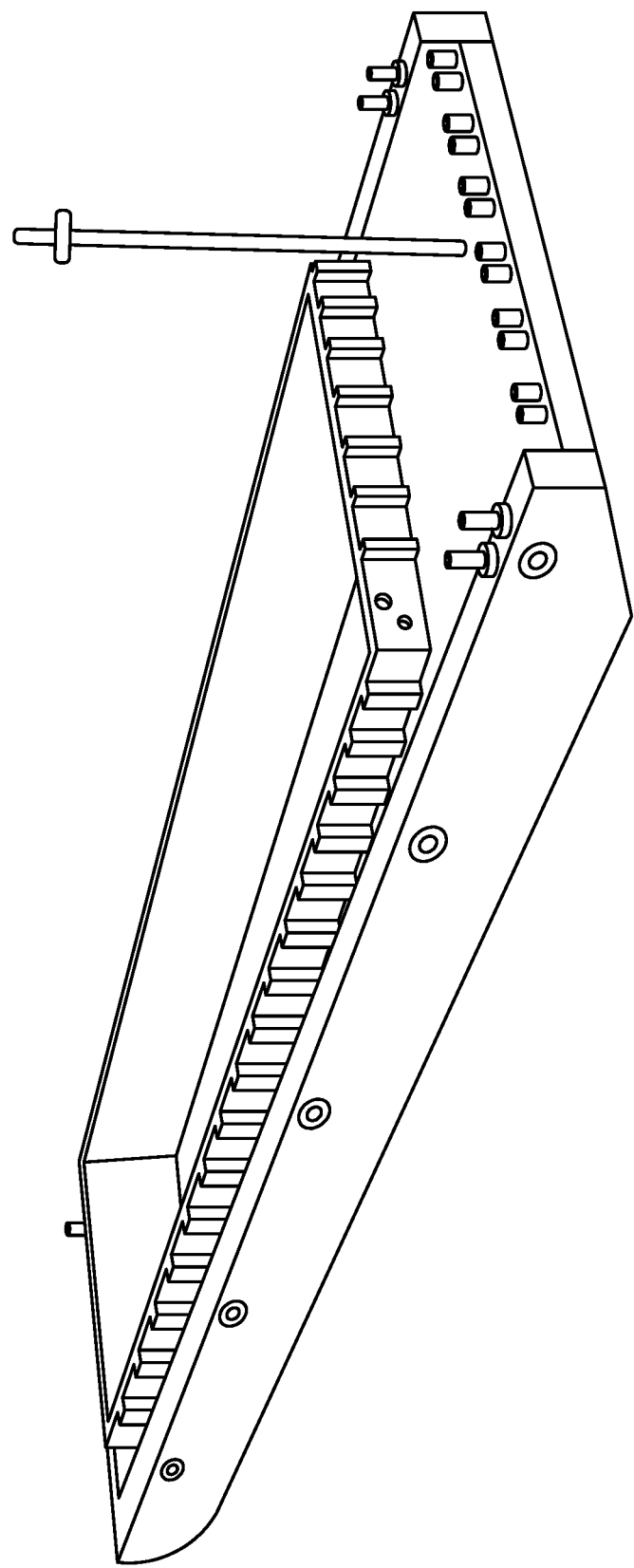
FIG. 7 shows harvest of *Sargassum* via suction and dried aboard special drying greenhouse barges for high efficiency transport of *Sargassum*, in accordance with a third exemplary embodiment of the present invention.

FIG. 7 shows harvest of Sargassum via suction and dried aboard special drying greenhouse barges for high efficiency transport of Sargassum, in accordance with a third exemplary embodiment of the present invention.

In particular, Sargassum is first harvested using suction machinery. The harvested Sargassum is pumped directly onto oceangoing vessels, e.g., barges configured with a highly ventilated greenhouse, as shown in FIG. 7.

Production cost may be reduced with implementation of a drying process at sea. The biomass can be fully or more preferably only partially dried, e.g., up to 50%, at sea before departure from the harvest site.

When pumped directly onto oceangoing vessels, the Sargassum may be physically moved around with heavy machinery as it dries so that the Sargassum will dry more quickly.

The resultant high density, low weight dried Sargassum is towed to shore on the barge or oceangoing vessel.

In current embodiments, sea-faring ships are used rather than tugs and barges because the activities are far off the coast, e.g., at least 50 miles.

Farming without aquaculture gear inherently de-risks impact to boats and marine life. Nevertheless, the harvest system in accordance with the present invention preferably includes a bycatch reduction device (BRD).

Figure 8:
FIG. 8 shows another embodiment of a harvest system, in accordance with the present invention.

FIG. 8 shows another embodiment of a harvester, in accordance with the present invention.

In particular, as shown in FIG. 8, a length of netting (e.g., 10 m wide) may be floated to capture floating Sargassum.

Figure 9A:
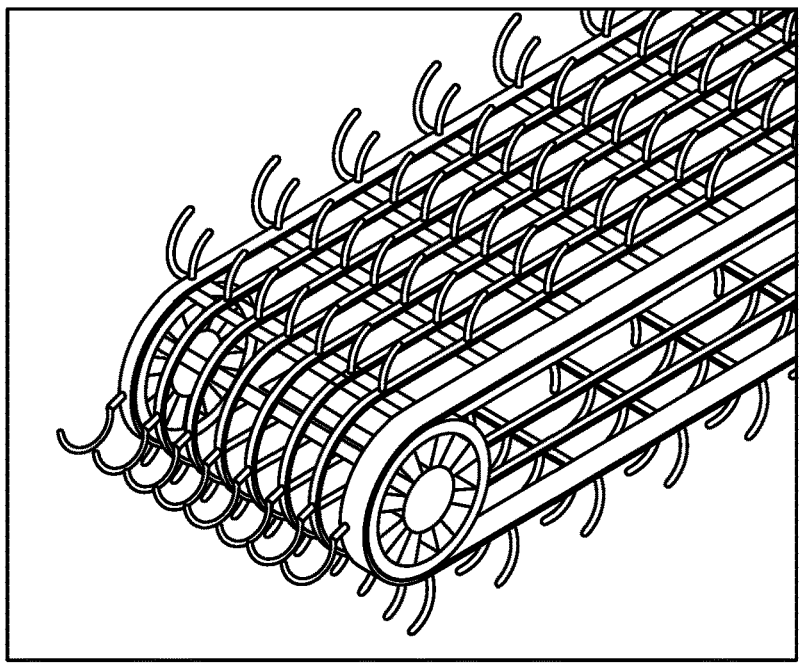
FIGS. 9A and 9B show an exemplary Bycatch Reduction Device (BRD) implemented as a conveyor with fish drop gaps.
Figure 9B:
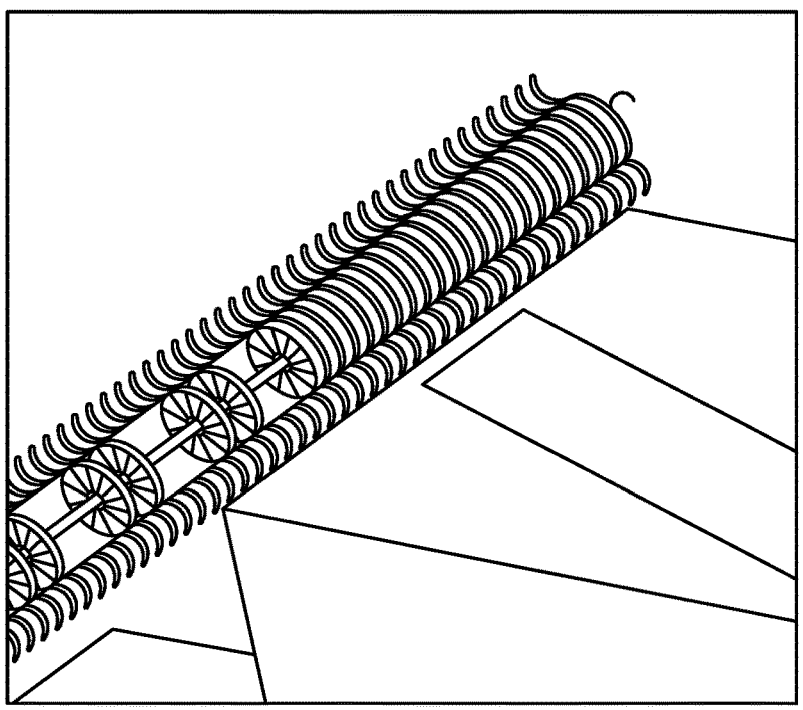

FIGS. 9A and 9B show an exemplary Bycatch Reduction Device (BRD) implemented as a conveyor with fish drop gaps.

In particular, FIGS. 9A and 9B show a conveyor harvesting system for moving Sargassum from the sea to a harvesting vessel. The conveyor harvesting system importantly separates bycatch during harvest. Preferably the conveyor harvesting system is used with spacing and shaking to harvest Sargassum while encouraging bycatch to fall through to the ocean. Thus the harvest system protects bycatch of marine species (e.g., juvenile sea turtles, fish).

The harvest system also preferably includes a turtle exclusion device (TED).

Figure 10:
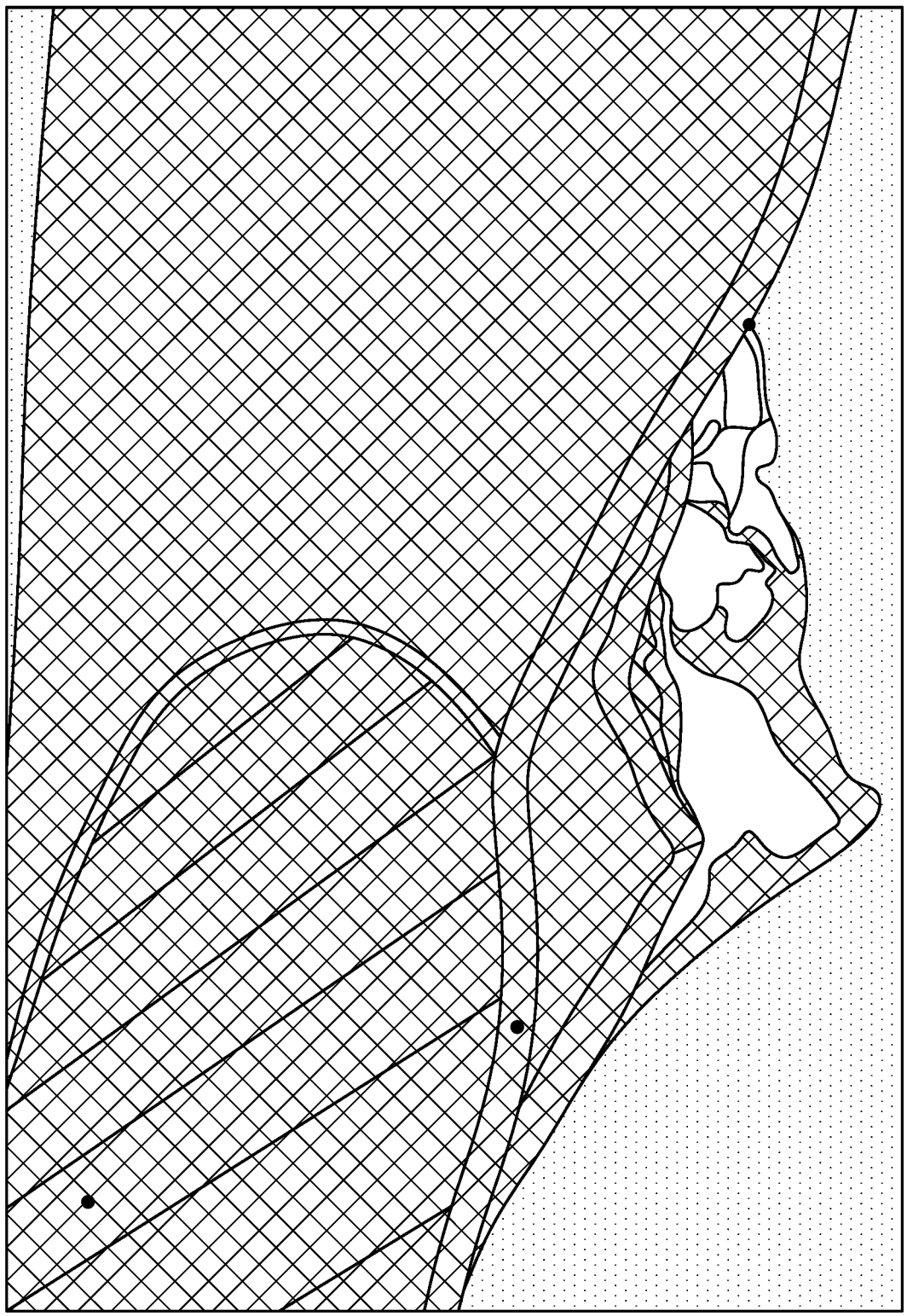
FIG. 10 shows a turtle exiting a trap door operating as an exemplary Turtle Exclusion Device.
Figure 11:
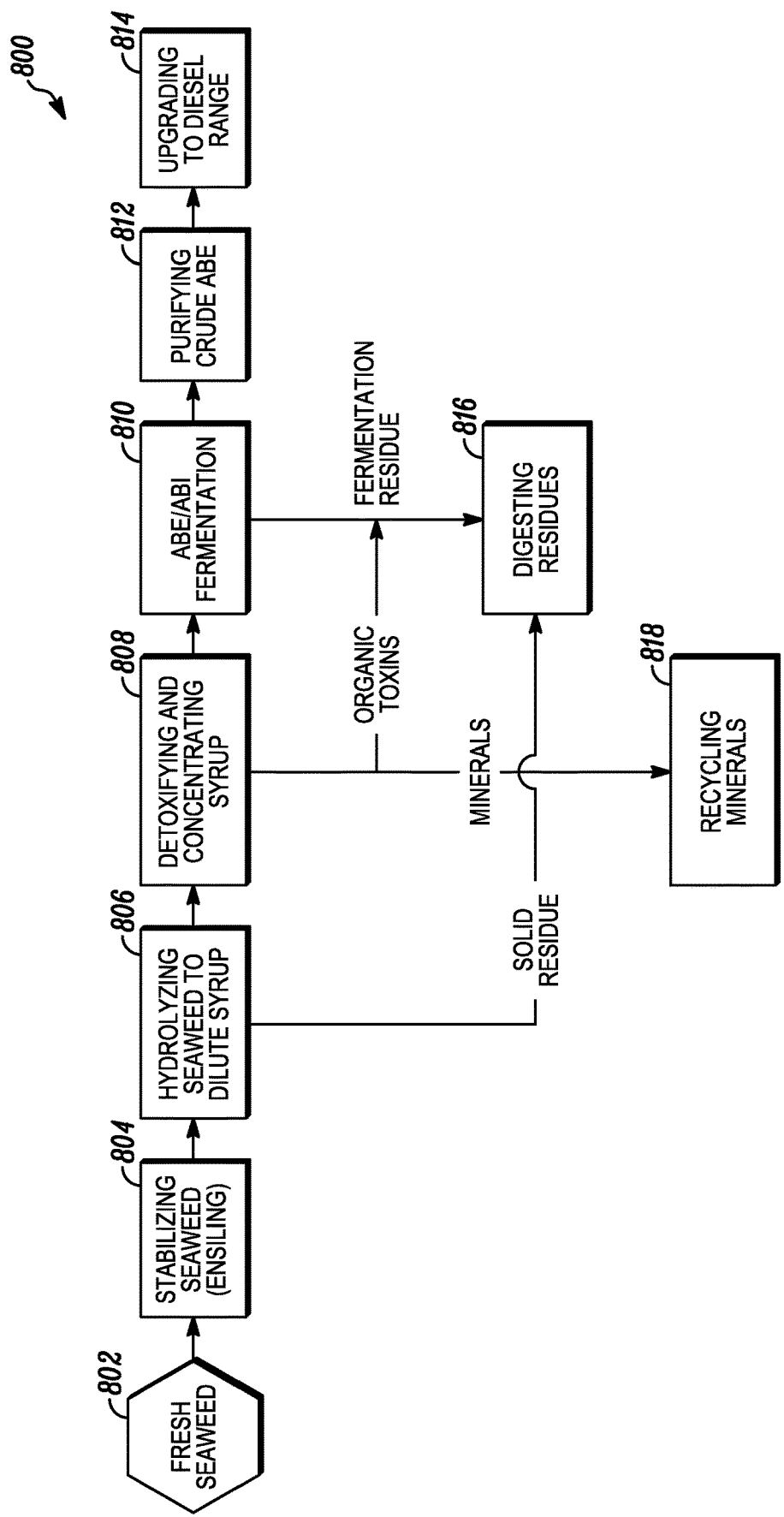
FIG. 11 shows a block flow depicting a conventional macroalgae to biofuel conversion process.

FIG. 10 shows a turtle exiting a trap door operating as an exemplary Turtle Exclusion Device.

The invention has particular applicability to energy companies, fertilizer companies, medical companies, building materials companies, paper packaging companies and cosmetics companies, to provide increased sustainability and a reduction in costs from the way energy, fertilizer, medicines, building materials, and paper and packaging and cosmetics are conventionally produced.

Sargassum mats are grown for conversion into fuel through a process that harnesses the power of existing ocean currents to transport the material and keep it close to shore. Two species of Sargassum (*Fluitans* and *Natans*) have been identified as being preferred for cultivation based on their natural prevalence as well as their beneficial physiological characteristics such as surface floating behavior. Sargassum is tracked and monitored during the ranching period using a combination of sophisticated satellite imagery technology (Sentinel 3 MERIS, MODIS data and SaWS).

The ranching process uses techniques that create habitat and thereby increase fisheries at a time of over-harvesting. By producing additional floating mats that provide habitat for marine life during the three month growing period, and by returning plant cuttings to the water at the initial starter crop location to restore the material, the technique achieves no net loss of habitat, and in fact, creates additional habitat during the crop season.

The actual amount of energy produced upon conversion of the harvested biomass is a function of the biomass' internal composition (lipids, carbohydrates, etc.) which varies with several factors including season, species, and available nutrients. While growth is a function of several physical parameters in the environment, the volume of and density of the Sargassum also impacts overall growth of a mat. The density of naturally occurring Sargassum mats varies, though the inventors have measured an average of 3 kg/m2 in wild mats. The density of mats formed in the process of the present invention is governed by nature. Presumably an optimal density will be reached naturally by the plants. When determining the amount of *Sargassum* mats grown over a period of time, growth rate and starting mass are the two necessary inputs. To determine the amount of biomass grown over the course of the ranching period, the following equation may be utilized:

$$k = \frac{\log 2\left(\frac{Wt}{Wi}\right)}{t}$$

k=the specific growth rate expressed as doublings per day, Wi=the initial weight of the thallus, and Wt=the weight of the plant after t number of days.

Two distinct and separate satellite imagery tools are utilized in the ranching process-data from the *Sargassum* Watch System and Sentinel 3. The *Sargassum* Watch System (SaWS), which uses NASA MODIS A and T and VIIRS, is a publicly available tool which utilizes satellite data from four sensors as well as numerical models to detect and track pelagic *Sargassum*. Raw satellite data are provided by two entities—U.S. NASA and USGS. If the new growth *Sargassum* farm is large enough to be seen with 1 km resolution images, Satellite images can be used to monitor a recent location of the new growth *Sargassum* farm.

While numerous types of images are produced from the data, the primary product of interest from this tool is the floating algae index (FAI). This index is used to detect floating algae and other materials on the ocean surface based on the spectrum of light produced from material on the surface in comparison to clear ocean water.

There are five image products produced: (1) A ci (Color Index) image, (2) An efai (Enhanced Floating Algae Index) image, (3) A fai (Floating Algae Index) image, (4) A lh (Fluorescence Line Height) image, (5) A normal rgb image. All images are mapped to a cylindrical equidistant projection with a 1 kilometer resolution. The green swirls are *Sargassum* mats. Dark or black areas in the image are caused by obstacles between the surface and the satellite such as cloud cover.

To identify wild *Sargassum* mats, a percent coverage of a pixel is determined using linear unmixing by referring to the AFAI of a nearby pure water pixel and a global upper bound (which represents 100% coverage). As a result, the spectra generated in each image is unique to the image and cannot directly be compared to images taken on a different day, i.e. a particular AFAI value may represent different coverage depending on the nearby water signal value on that particular day.

Another Satellite technology using data from Sentinel 3 may be employed. Sentinel 3 is one of the satellites in Copernicus' fleet. Copernicus is a European Union Program focused on developing information services using satellite Earth Observation and in situ (non-space) data. The Earth observation satellites which provide the data for Copernicus services are split into two groups of missions—The Sentinels and The Contributing Missions. Sentinels-1, -2, -3, -5P and -6 are dedicated satellites, while Sentinel-4 and 5 are instruments onboard EUMETSAT's weather satellites. The Contributing Missions provide a wealth of data for Copernicus services. Information services provided by Copernicus are made available to the public free of charge (ESA, 2017).

Sentinel 3 data in particular is available from the Sentinel 3a satellite on the Pre-operations Data Hub. From the hub, here, target locations, imaging dates, sensor, processing level and product can be selected. To map *Sargassum*, OLCI sensor's "OL_1_EFR_" product is processed to level 1. This approach uses satellite-measured radiances in 21 spectral bands of 300 m spatial resolution images of square areas ~1100 km across at ~4-day intervals for a given site. Note: Images are ~600 Mbytes each. These Images are processed using SNAP software, which is distributed free by the ESA. Best discrimination of floating vegetation is presently being achieved using "negative FLH" images to detect increasing radiance at the red-edge wavelength of 709 nm, compared to wavelengths 665 and 681 nm. Negative FLH provides a measure of the excess radiance at 709 nm compared to the baseline value expected from linear extrapolation of radiances at 665 and 681 nm.

Such extrapolation would not be valid where high surface chlorophyll concentrations lead to high FLH values, but this is a minor problem in most cases, except in coastal waters. Negative FLH has the advantage of extracting data from the narrower spectral range, 665 to 709 nm (a range of 44 nm), compared to 681 to 753 (a range of 72 nm) for MCI. This range reduces its sensitivity to haze and aerosols allowing a higher near IR threshold (assuming "clear water has a 865 nm radiance <20 mW.m-2.nm-1.ster-1").

The Gulf of Mexico has complicated and interconnected currents impacted by a variety of sources. One source in particular is the Loop Current which transports water between Mexico and Cuba from the Caribbean. This current is characterized by an average speed of about 0.8 m/s, a width of between 125 and 190 miles, and a depth of 2600 feet. Flowing northward at first, the current eventually loops southeastward south of the Florida Keys then west of the westernmost Bahamas. From the Bahamas, the current heads north following the coast of the U.S. where it becomes known as the Gulf Stream. In addition to ocean currents, the Gulf of Mexico has weather and wind patterns that impact water movement.

The TABS web page is host to numerous databases and resources. A graphical map depicts current vectors with links to data tables and historical databases. Another useful tool is the automated continental shelf forecast system that predicts currents over the Texas-Louisiana shelf. This system is comprised of four aspects: forecast wind field retrieving and preparation, a shelf circulation model module, a simulation plotting module, and a web display and file transfer module. These modules in combination allow prediction of surface currents twenty-four hours into the future.

Currents, nutrients, salinity, water temperature and proximity to shore are important in the farming areas. Available nutrients coupled with recycled *Sargassum* biomass material from the conversion process facilitate growth in the ranching area. Ideally salinity of the selected ranch area should range between 28 and 30 during the main growing period of April, May, June and July. Ideally a *Sargassum* ranch location is selected to balance currents, nutrients, salinity, water temperature and proximity to shore.

Process Steps

1. Identify already existent (naturally occurring) *Sargassum* mats in the relevant body of water, e.g., in the Gulf of Mexico, using satellite images, e.g., using SaWS and Sentinel 3 data. Harvest a starter amount of the *Sargassum* material from the existent mat of *Sargassum*. Then use this harvested starter amount of *Sargassum* material, referred to as "cuttings", to "plant" a new growth ranch. In the given example a starter amount of the *Sargassum* material is 49,000,000 kg.

a. Place the harvested starter culture of *Sargassum* in a transport vessel to navigate to the location within an ocean current where the farm is to be grown.

b. Depending on the prevalence and location of naturally occurring mats, preference may be given to harvesting starter material from a doomed mat. A doomed mat is a mat that is on a trajectory to land on the coast and cause a nuisance and possible expense for removal.

2. Biomass material is taken aboard the ship.

a. *Sargassum* material is harvested in a way as to minimize by-catch.

b. The harvested material is then cut into "seedlings" for a starter culture.

c. To harvest sufficient cuttings, an appropriate starter culture will typically require a plurality of vessels or barges, e.g., three barges (dimensions of 180×54×12.5 feet) taking loads from the harvested mat to the new growth ranch starting location for a period of time, e.g., for 26 days.

3. Sufficient cuttings (e.g., 2,850,000 kg) from the harvested *Sargassum* forming the starter culture are returned to the mat to grow into healthy mature plants so as to replenish the material that was removed. The replacement of a manually manipulated and created starter culture ensures on a seasonal basis, that the mass of *Sargassum* remains either constant (no net loss) or at an acceptable mass in the relevant body of water.

4. The cuttings forming the starter culture are preferably transported to an area in the open ocean chosen to provide the best balance of criteria for starting new growth, monitoring and ultimately harvesting a *Sargassum* farm. Criteria may include a determination of being at the head end or beginning of expected currents during the growth of the relevant farm, available nutrients, salinity of the ocean water, water temperature and proximity to shore. Proximity to shore primarily relates to an expected proximity to shore upon reaching the maturity for harvest, though placement of the starter culture proximate to shore is also desirable. The main criteria is duration of the circular current currently running through the selected area for initial seeding of the *Sargassum* farm.

a. The starter crop is preferably placed in the water on the side of the vessel that is against the currents. The currents will push the material into the side of the barge to facilitate mat formation.

5. The planted starter culture is embedded with farm monitoring vehicles, i.e., floating sea drones or GPS drifters 300, 400. For instance, a typical new growth *Sargassum* farm mat may include four GPS drifters 300, 400. These floating sea drone GPS drifters 300, 400 are preferably outfitted with a GPS sensor, and long range communication capability to provide data to a remote monitoring station. Broadband satellite communication capability is suitable, or WiFi to a suitable water-borne or ship-borne router, or cellular if within range of a base station (e.g., within 3 or 4 miles), or other communication device is included to enable the GPS drifter 300, 400 to track the new growth *Sargassum* ranch's route & location.

6. Starter crop is preferably added to the location of the new growth *Sargassum* ranch over a period of days, e.g., over the course of 26 days. Of course, shorter and longer time periods of starter crop injection is possible and within the principles of the invention. Also, the new growth *Sargassum* ranch will of course move location over the course of seeding lasting a period of days.

7. The starter culture within the new growth *Sargassum* ranch starts to grow from day one and continues for up to 90 days as the *Sargassum* ranch follows its natural course within the circular current. Importantly, the route of the *Sargassum* ranch is tracked by tracking the GPS drifter(s) 300, 400 adhered thereto.

It is preferable to use multiple GPS drifters 300, 400 to reduce the risk of failure, damage, overturning, non-adherence to the mat, etc. of any one GPS drifter 300, 400.

8. After a period of time sufficient for growth of the starter *Sargassum* material, e.g., after approximately 28 days of growth, harvesting begins. Large vessels and potentially barges are used to harvest the material. In a typical body of water such as the Gulf of Mexico the new growth *Sargassum* ranch will have traveled, e.g., 39 miles along its route during the growth period.

a. A plurality of vessels such as containerships or barges can be used to haul the harvested *Sargassum*.

b. A crane and harvesting arm are used to bring the biomass material to an industrial scale conveyor belt which transports the material into holding containers on the vessels. The conveyor belt system works in tandem with a suitable bycatch removal system.

9. Once a container vessel or barge is full, the vessel transports the biomass to the processing center, e.g., land-based processing center.

a. Harvested *Sargassum* material is off-loaded from each vessel at the processing center using the conveyor belt system.

b. Though not necessary, nutrients from the biomass conversion may be loaded back onto the holding containers on the vessel or barge so that the nutrients, potentially in the form of nutrient pellets, may be disbursed when the barge returns to the new growth ranch crop.

Nutrients may also be provided to the seedlings by transporting the seedlings in coastal, nutrient-rich water, e.g., in a holding tank of a harvest vessel.

Nutrients resulting from energy conversion of biomass may be added to the seedlings during transport.

10. The vessel returns to the new growth *Sargassum* ranch (which has freely drifted along with the route based on winds, water current, intervening storms, etc.) and repeats the loading cycle. The vessel may communicate either with the central data tracking facility, or directly with the GPS drifters 300, 400 adhered to a given new growth *Sargassum* ranch, to determine in real-time the current location of the *Sargassum* ranch, and thus where to travel to.

a. Preferably there is a single processing center located on the coast of the region or off shore proximate to the farm site(s). Thus, the new growth farm location is preferably located such that the average one way distance the harvesting vessel(s) will have to travel is minimized over the course of the harvesting period.

11. The harvesting period of the process extends, e.g., 62 days. Carbohydrate extraction and fermentation is identified as a desirable pathway for conversion of the harvested material to fuel. This mode is preferable because the concentration of carbohydrates in the macroalgae can be manipulated based on the available nutrients and compounds in the growth environment. An example of this phenomenon is when some microalgal species are subjected to nutrient starvation or high light intensity; they will build-up carbohydrates within their cells. It is therefore possible to potentially impact the future energy content of the biomass based on the specific nutrients that are recycled back to the ranch from the conversion process. Such manipulation of the growing *Sargassum* at the new growth *Sargassum* ranch to, e.g., have built-up carbohydrates within their cells, is not required but is within the principles of the present invention.

Important pieces of equipment are the harvesting equipment, the *Sargassum* cutting tool, crop harvesting vessels, and location drifters (i.e., GPS drifters 300, 400).

Note that while embodiments disclosed herein include GPS functionality on the GPS drifters 300, 400 that are co-located with a free-floating new growth *Sargassum* mat, other satellite or location technology may be implemented within the principles of the present invention. For instance, the GLONASS satellite system may be used. Alternatively, though less preferably, a transmitting location beacon (e.g., an EPIRB) may be implemented on the drifter, and/or location may be determined without satellite use by triangulation using multiple receivers.

A flexible harvester ship may have one or more (e.g., two) arms mounted thereon. In some embodiments the flexible harvester ship is a 1700 to 3500 TEU containership capable of 18+ knots with built-in cranes. Ideally the flexible harvester ship is pre-certified, safe, stable, capable of a large payload, fast speed (18+ knots), and affordable.

The flexible harvester ship preferably uses energy-saving, mature propulsion and power systems. For example, the flexible harvester ship preferably includes hybrid electric drive, foldable solar panels (ISO solar panels), expandable wind generator and sails (ISO wind generator), and fuel cells.

The flexible harvester ship preferably is modular. For instance, it is preferable that production equipment can be quickly installed and uninstalled within a few days to convert the harvesting vessel into other uses. In this way technicians and/or vessels may be shared with relevant US government branches, e.g., US Navy, US Coast Guard, NATO sealift, patrol, and hospital ships.

The flexible harvester ship may be an all-in-one vessel which can perform seeding of *Sargassum*, cutting of *Sargassum*, harvesting of *Sargassum*, mulching of *Sargassum*, and transport of the *Sargassum* product.

Optionally, the flexible harvester ship may include an option to fit a refinery.

The scalable, non-stationary, floating farm includes at least one GPS drifter 300, 400 which monitors the floating, naturally moving *Sargassum* farm 24/7 with automated UAV, USV and UUV sensors.

The flexible harvester system performs a harvest with, e.g., a 100 m-wide netting which includes a Turtle Exclusion Device (TED). The netting is large, safe, lightweight, has fast operability, is retractable, and efficient.

The flexible harvester system preferably includes auto conveyors that bring seaweed from net-end to ship, and includes a Bycatch Reduction Device (BRD).

While water jet cutting is preferred, the seedlings may be generated using mulching machines with artificial intelligence (AI)-controllable blade RPM to cut a portion of the harvest to a desired seedling size. The seaweed is preferably mulched to minimize transport volume and cost.

The flexible harvester system may optionally include a water extractor to reduce the weight of wet seaweed. Exited liquid travels through an oily water separator in the water extractor to extract bio-oil. Debris may become fertilizer or solid fuel to burn.

The flexible harvester system may include a rapid store/unload/load in ISO containers with lids.

Preferably the containership and the port include automated ISO container loaders. The harvesting containership preferably includes two cranes, which work in conjunction with port-based cranes.

With respect to the harvesting units, the harvesting arms and bycatch reduction nets are utilized to harvest the growing crop based on a purpose-driven design to efficiently harvest while reducing bycatch.

*Sargassum* thrives by floating on currents while associated species provide nutrients. The macroalgae do not require aquaculture gear for containment. As a result, the invention provides a smaller impact in the marine space. Efficiencies are provided by the invention in biomass production, pre-treatment and end product.

The invention substitutes natural circulating currents (eddies) as a means to contain a farm of *Sargassum*, rather than use of fixed aquaculture gear as in conventional systems.

The invention may be used together with an energy conversion process such as LNG (natural gas) and/or be used to form a sustainable products stream such as bioplastics, etc.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

While the invention has been described with reference to the exemplary embodiments thereof, those skilled in the art will be able to make various modifications to the described embodiments of the invention without departing from the true spirit and scope of the invention.

What is claimed is:

1. A method of sustainably growing and harvesting macroalgae in a free-floating and free-roaming ranch, the method comprising:
    identifying a wild, free-floating *Sargassum* mat in an open body of water;
    harvesting a fraction of the wild, free-floating *Sargassum* mat aboard a floating vessel to generate a starter material;
    cutting the starter material into cuttings above water using a water jet cutter aboard the floating vessel;
    injecting a first portion of the cuttings adjacent to the unharvested wild, free-floating *Sargassum* mat;
    transporting the remaining portion of the cuttings to another location away from the wild, free-floating *Sargassum* mat in the open body of water;
    adding at least four floating drifting farm monitors and the remaining portion of the cuttings to a side of the floating vessel that is against-currents, wherein each of the at least four floating drifting farm monitors will be embedded within a new *Sargassum* ranch formed by the cuttings being pushed together by the currents against the side of the floating vessel to facilitate a dense mat formation over a course of at least several weeks; and
    tracking a location of the new *Sargassum* ranch over a period of days via a signal transmitted from at least one of the floating drifting farm monitors.

2. The method of claim 1, wherein the location where the new *Sargassum* ranch is formed is at least 10 miles away from the wild, free-floating *Sargassum* mat.

3. The method of claim 1, wherein the remaining portion of the cuttings are shipped to the another location in nutrient-rich, coastal water.

4. The method of claim 1, wherein at least one of the floating drifting farm monitors includes a global positioning system (GPS) sensor and a long range wireless communication device.

5. The method of claim 4, wherein the at least one of the floating drifting farm monitors further includes a camera to provide a visual image of the new *Sargassum* ranch.

6. The method of claim 1, further comprising:
    harvesting the new *Sargassum* ranch at least 28 days after transporting the remaining portion of the cuttings to the new *Sargassum* ranch.

7. The method of claim 1, further comprising: manipulating nutrients or light intensity of the remaining portion of the cuttings on board the floating vessel.

8. The method of claim 7, wherein the method enhances carbohydrate production for biofuel.

\* \* \* \* \*